Dec. 23, 1969     D. J. CRITCHELL     3,485,902
METHOD OF MAKING A DIALYZING ELEMENT
Filed Jan. 12, 1967     3 Sheets-Sheet 1

DEAN J. CRITCHELL
INVENTOR.

BY
ATTORNEYS

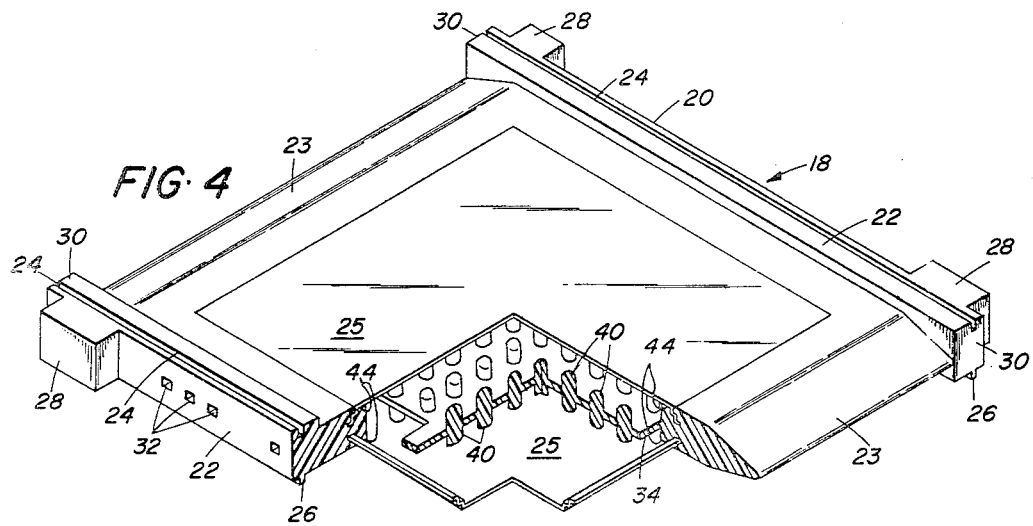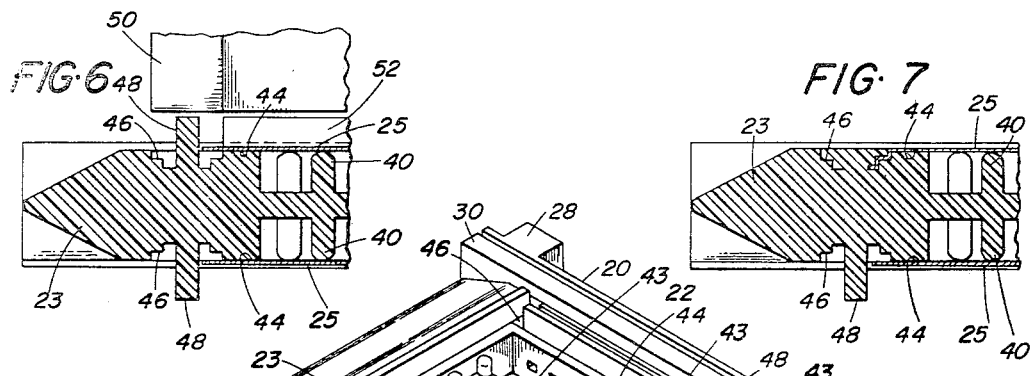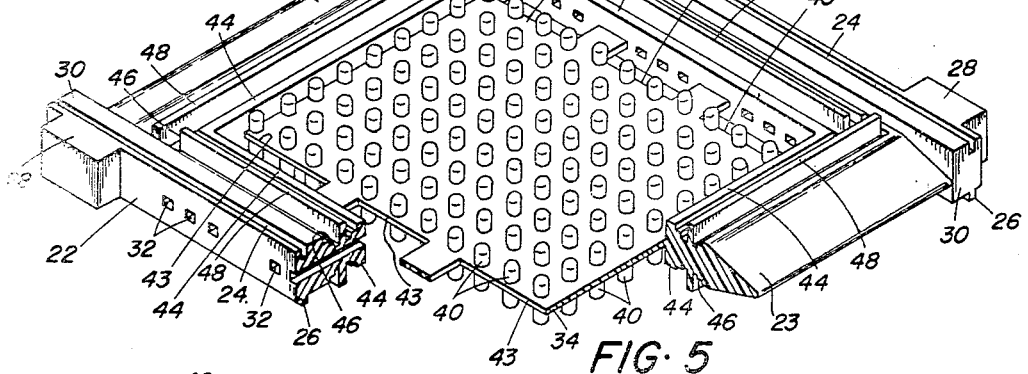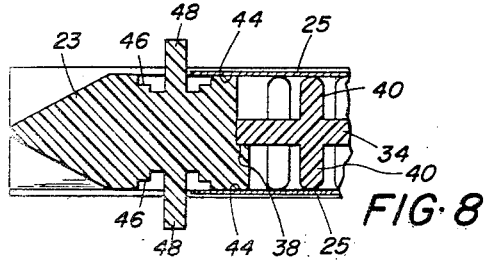

Dec. 23, 1969   D. J. CRITCHELL   3,485,902
METHOD OF MAKING A DIALYZING ELEMENT
Filed Jan. 12, 1967   3 Sheets-Sheet 3

DEAN J. CRITCHELL
INVENTOR.

ATTORNEYS

United States Patent Office 3,485,902
Patented Dec. 23, 1969

3,485,902
METHOD OF MAKING A DIALYZING ELEMENT
Dean J. Critchell, Rochester, N.Y., assignor to Eastman Kodak Company, Rochester, N.Y., a corporation of New Jersey
Filed Jan. 12, 1967, Ser. No. 608,783
Int. Cl. B01d 13/04; B29d 31/00
U.S. Cl. 264—23                               3 Claims

ABSTRACT OF THE DISCLOSURE

A method of making a dialyzer cartridge comprising a stacked assembly of dialyzing elements enclosed by a housing defining inlet and outlet manifolds. Each dialyzing element includes a frame defining perimeter segments. A plate extends between the frame segments and defines spaced projections extending from opposite sides thereof. Membranes, which have edges imbedded in the frame segments by a fusing process, engage the projections and are supported thereby.

---

This invention relates to dialyzing apparatus and more specifically to an improved method of making a dialyzing element for a dialyzer cartridge.

In copending application Ser. No. 608,784 filed on Jan. 12, 1967 by John J. Meyers et al. there is disclosed a dialyzer cartridge comprising a stacked assembly of dialyzing elements enclosed by a housing defining inlet and outlet manifolds. Each dialyzing element comprises a frame having spaced membrane walls and having openings for fluid flow through the interior of the frame in contact with the interior surfaces of said membrane walls. The dialyzing elements are stacked with the adjacent walls of adjacent elements in closely spaced relationship. The housing manifolds are effective to establish parallel flow of a first fluid between the dialyzing elements and parallel flow of a second fluid through the interiors of the elements.

In the particular embodiment of the dialyzing elements disclosed in the aforementioned application the membrane walls are formed by membrane sheets sealed at their edges to the frame segments. The membrane sheets are positioned in engagement with mesh supporting sheets which are in turn supported on suitable ribs extending between opposite perimeter segments of the frame. The mesh material serves to reinforce the membrane material and prevent excessive distortion thereof during variations in pressure of the fluid in contact therewith.

It is a general object of this invention to provide an improved method of making a dialyzing element of the general type disclosed in the aforementioned application.

Another object of the invention is to provide an improved method of forming a frame for supporting a flexible member such as a thin membrane.

In the disclosed specific embodiment of the invention a frame for a dialyzing element comprises a generally hollow frame of rectangular configuration and defining perimeter frame segments. A membrane supporting means positioned within the frame defines a plurality of spaced projections extending from opposite sides thereof. A pair of membranes are sealed to opposite sides of the frame and engage the portions of the substantially hemispherical ends of the spaced projections to be supported thereby.

In fabrication of the dialyzing element the frame and membrane supporting means may be molded as an integral part from plastic or other low cost material or comprise separate parts fixed together.

Figure 1:
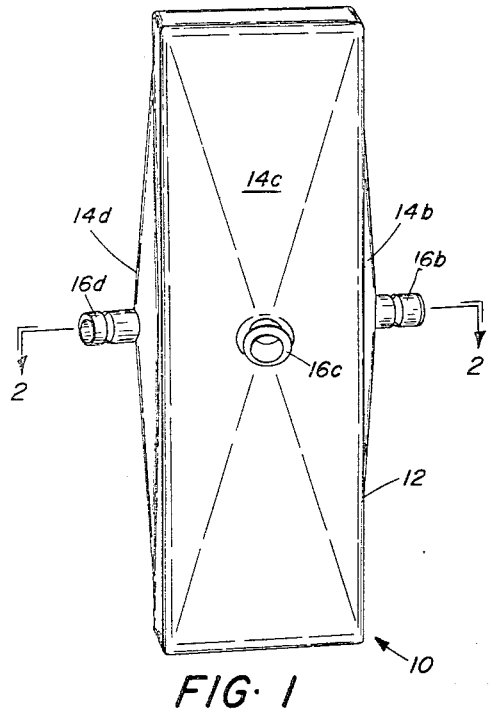
Figure 3:
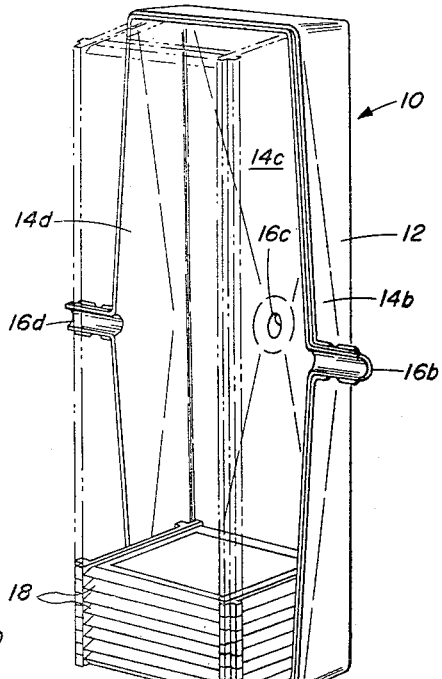
Figure 2:
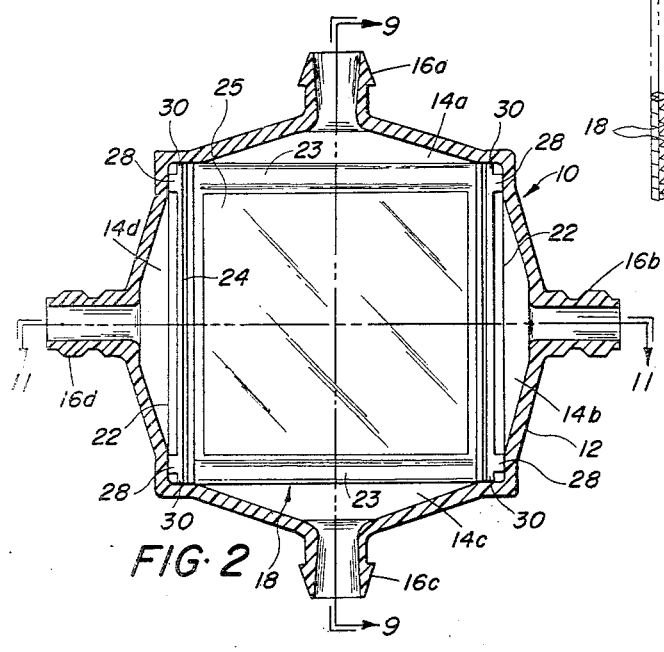
Figure 9:
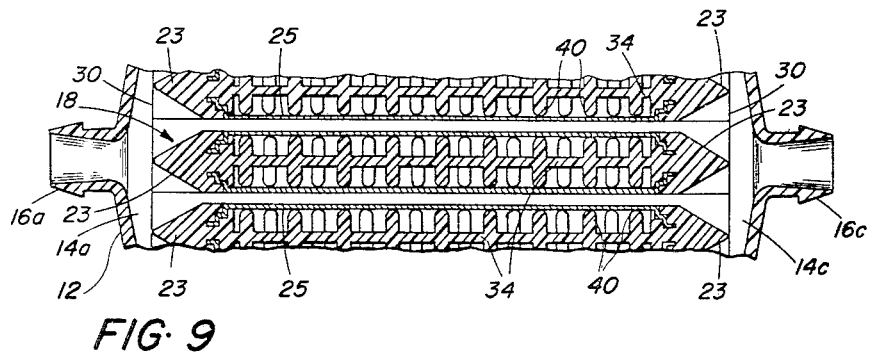
Figure 10:
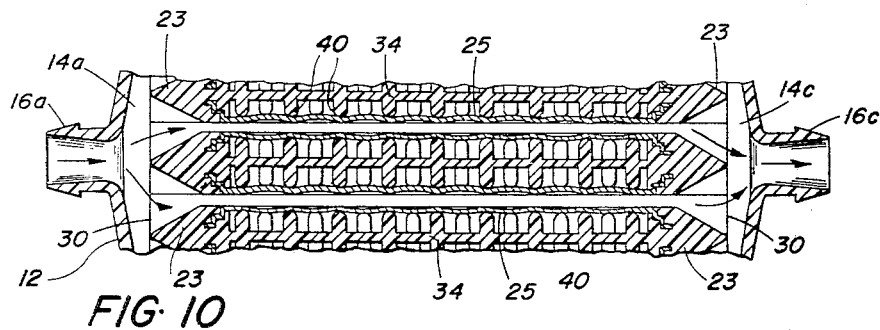
Figure 11:
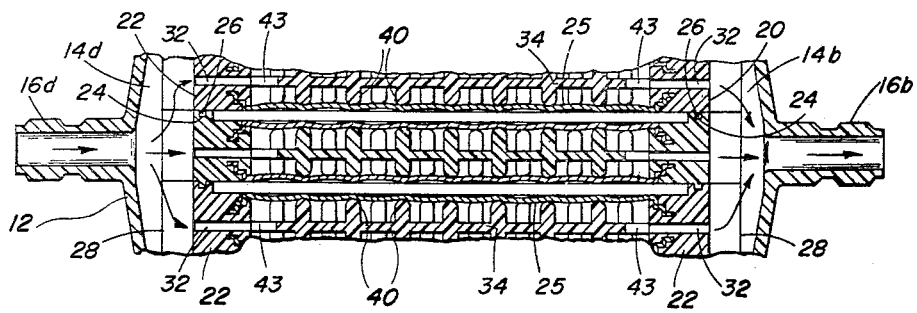

Other objects and advantages will become apparent from the following description taken in connection with the accompanying drawing wherein:

FIG. 1 is a perspective view of a dialyzer cartridge;
FIG. 2 is a section taken along the line 2—2 of FIG. 1;
FIG. 3 is a perspective view of the dialyzer cartridge with one part of the housing removed;
FIG. 4 is a perspective view of a dialyzing element in accordance with the invention;
FIG. 5 is a perspective view of a membrane supporting frame in accordance with the invention;
FIGS. 6 and 7 are enlarged partial sections illustrating the method of sealing membranes to the supporting frame;
FIG. 8 is a view similar to FIG. 6 showing another embodiment of the membrane support member;
FIGS. 9 and 10 are enlarged partial sections taken along the line 9—9 of FIG. 2 showing several stacked dialyzing elements in accordance with the invention and the configuration of the membrane walls thereof in the absence of and during fluid flow through the cartridge respectively; and
FIG. 11 is an enlarged partial section similar to FIG. 9 but taken along the line 11—11 of FIG. 2.

Referring to FIGS. 1, 2, and 3 of the drawings there is shown a dialyzer cartridge 10 of the general type disclosed and claimed in the aforementioned copending application. Cartridge 10 comprises a two part housing 12 of generally square cross section. The medial side wall portions of the housing 12 are slightly bulged to define a plurality of fluid manifolds 14, which are separately identified by the suffix letters a, b, c, and d. The manifolds 14 are provided with fluid inlet and outlet nipples 16 also separately identified by the suffix letters a, b, c, and d. As shown more clearly in FIG. 2 the inlet and outlet nipples 16 may comprise integrally formed parts having a configuration which facilitates coupling of fluid conduits thereto by suitable clamps.

As will be apparent from FIGS. 2 and 3 of the drawings, the two part housing 12 comprises identical half sections defined by a longitudinal plane extending through the nipples 16b and 16d. The housing sections may be stamped or molded from suitable materials such as plastic materials and may be retained together by cementing or welding in the manner described in the aforementioned copending application.

As shown most clearly in FIG. 3, the housing 24 contains a plurality of stacked dialyzing elements 18 of relatively thin rectangular configuration. As disclosed in the aforementioned copending application, a cartridge for use as an artificial kidney may include for example 60 stacked dialyzing elements having planar dimensions of approximately 2 x 2 inches.

Referring specifically to FIGS. 4–7 of the drawings, each of the dialyzing elements 18 comprises a generally rectangular shaped frame 20 comprising a pair of opposite border portions or segments 22 of configuration to facilitate stacking of the dialyzing elements 18 and a pair of opposite border portions or segments 23 of identical configuration and wedge shaped to facilitate the flow of fluid between adjacent dialyzing elements 18 of the stacked assembly. A pair of semipermeable membranes 25 are sealed to opposite sides of the frame 20 to substantially enclose the frame and define membrane walls for the frame.

Referring specifically to the opposite segments 22, each segment is provided with a longitudinal groove or recess 24 in the upper surface thereof and a longitudinal tongue or depending flange 26 in the lower surface thereof. The flanges 26 on the lower surfaces of the segments 34 are complementally arranged with respect to the grooves 24 in the upper surfaces of the segments 22 to be received by the grooves 24 of an adjacent frame upon stacking of the dialyzing elements 18 in the manner shown in FIG. 3 of the drawings. The frames 20 may be accordingly stacked together in a "tongue and groove" arrangement.

The opposite segments 22 of each frame 20 are also provided with an integral rectangular shaped abutment 28 adjacent each end portion 30 thereof. When the dialyzing elements are stacked as shown in FIG. 3 the posts 28 and the end portions 30 of adjacent frames 20 are positioned in abutting engagement to define longitudinal surfaces of the stacked assembly to which the corners of the housing 12 are sealed during assembly of the cartridge in the manner described in the aforementioned copending application. The opposite segments 22 are additionally provided with a plurality of openings 32 for the flow of fluid through each dialyzing element 18.

The opposite segments 23 are of generally wedge shaped configuration to present a minimum resistance to fluid flow between adjacent dialyzing elements 18. Moreover the segments 23 are provided with a thickness less than that of segments 22 as disclosed in the aforementioned copending application for the purpose of establishing a predetermined space between the membrane walls of adjacent dialyzing elements to permit the flow of fluid between the stacked elements in the manner described in the aforementioned copending application.

The structure thus far described is generally the same as that disclosed and claimed in the aforementioned copending application, and reference is made to said copending application for a more complete description of the parts described above.

Referring to FIGS. 4–8 a membrane supporting means comprising a thin plate member 34 is positioned within the frame 20 in a plane substantially coinciding with the centerplane of the frame 20. The plate member 34 preferably comprises an integral part of the frame 20 as shown in FIGS. 4–7. Alternatively, however, the plate member 34 may comprise a separate part fixed to the surface of a suitable inner perimeter shoulder 38 of the frame 20 such as by cementing or by appropriate welding techniques as shown in FIG. 8 of the drawings.

The plate member 34 defines a plurality of outwardly extending projections defining generally cylindrical shaped membrane supporting members 40 on opposite sides thereof. The ends of the membrane supporting members 40 on each side of the plate member 34 define a pair of spaced parallel planes and a plurality of spaced substantially hemispherical membrane supporting surfaces lying in said planes respectively. The membrane supporting members 40 are preferably formed integrally with the plate member 34 during molding of the frame 20 in the manner hereinbefore described. Alternatively, the members 40 can also be separately fabricated and cemented or welded to the plate member 34.

The opposite ends of the plate member 34 adjacent the opposite segments 22 are recessed as indicated at 43 to permit the flow of fluid from openings 32 to opposite sides of the plate member 34 or vice versa. On each side of the plate member 34 the spaced arrangement of the membrane supporting members 40 permits fluid to flow freely from one segment 22 to the other.

Referring to the method and means for sealing the membranes 25 to the frame, the upper and lower surfaces of the frame segments 22 and 23 define inner perimeter membrane supporting surfaces 44 lying in the planes defined by the ends of the membrane supporting members 40 respectively and define recesses or channels 46 having the step configuration defining shoulders as illustrated in FIGS. 6 and 7. An integrally formed central flange 48 extends from the bottom of each recess 46 and upwardly therefrom, the cross sectional area of each flange 48 being substantially equal to the cross sectional area of the recess 46. As shown in FIG. 6 the membranes 25 are positioned with their edges in close proximity to the flanges 48 and with their edge portions overlying the recesses 46 on one side of the flanges 48. Sealing of the membranes 25 may then be accomplished by bringing a heated tool such as indicated at 50 into engagement with the flanges 48 with a direct downward predetermined pressure to fuse and force the material of the flanges 48 into the recesses 46 as indicated in FIG. 7. As the flange 46 is fused and deformed it spreads outward to fill the recess portions on both sides thereof and imbeds the edge portions of the membrane 25 as indicated in FIG. 7 to permanently retain and seal the same. The step configuration of the recess 44 causes the edge portion of the membrane 42 to assume a corresponding configuration during the sealing process and insures formation of a tight seal and permanent anchoring of the membrane edge portions.

The positioning of the flanges in the center of each recess is an important feature in that it permits flow of the flange material to both sides of the flanges and permits direct downward pressure to be applied to the flanges during the fusing operation. This even distribution of the fused flange material results in the smooth finish surface shown in FIG. 7.

The recess 44 and flange 46 are integrally formed to the configuration shown in FIG. 6 during the molding of the frame 20 and the plate member 34. Thus in fabrication of a dialyzing element embodying the invention the frame 20 may be molded or otherwise formed to the configuration shown in FIG. 4. It is then only necessary to place the membrane material in the position indicated in FIG. 6 and engage the flanges 48 with a tool to complete the dialyzing element. It will be apparent to those skilled in the art that the membranes may be sealed to the opposite sides of the frame 20 in a single operation by simultaneously bringing a pair of tools into engagement with the flanges 48 on the opposite sides of the frame.

The frame 20 is preferably formed from plastic material and the flanges 48 are engaged by a heated tool which melts the flanges and causes the flange material to substantially fill the recesses 46 as shown in FIG. 7. To protect the adjacent portions of the membranes 25 from heat damage a heat conductor 52 may be placed in contact with the membranes 52 as indicated in FIG. 6.

As an alternative method of sealing the edges of the membranes, the flanges 48 may be deformed into the recesses 46 by the application of ultrasonic vibrations thereto. Specifically a tool similar to the tool 50 may be vibrated at a suitable ultrasonic frequency and caused to engage the flanges 48 with a predetermined pressure to effectively deform or fuse the flange material into the recesses. Suitable ultrasonic techniques for accomplishing this are well known to those skilled in the art and further description is deemed to be unnecessary.

A plurality of dialyzing elements 18 fabricated in the above manner may be stacked and sealed in the housing 12 in the manner described in the aforementioned copending application. The stacked assembly is preferably sealed at its corners in the manner described in said application so that a fluid supplied to one of the manifolds 14a and 14c will be circulated through the spaces between adjacent dialyzing elements to the opposite manifold and a fluid supplied to one of the manifolds 14b and 14d will pass through the hollow interiors of the dialyzing elements 18 to the opposite manifold. If the cartridge is employed as an artificial kidney blood is preferably circulated between the dialyzing elements and dialyzant through the elements.

As shown in FIG. 9 of the drawings, during the absence of fluid flow through the cartridge, the spaced projections 40 serve to support the membranes 25 and maintain the flat configuration thereof. During fluid flow conditions the membranes 25 will deform slightly between the spaced projections in response to blood pressure as indicated in FIGS. 10 and 11. The substantially hemispherical membrane supporting surfaces insure that this slight deformation of the thin membrane does not create sudden enlargements or contractions in the blood flow path. As described in the aforementioned copending application, smooth exterior surfaces of the dialyzer element minimizes the flow resistance of each flow path and achieves a uniform blood flow without the turbulence or shearing effects inherent in the prior art kidneys.

I claim:
1. The method of making a dialyzing element for a dialyzing cartridge which includes the steps of: molding a frame forming perimeter segments integrally connected by a thin plate, said plate defining a plurality of spaced, substantially hemispherical surfaces projecting from opposite sides respectively of said plate; positioning semipermeable membranes in contact with opposite sides of said frame segments respectively and said hemispherical surfaces; and fusing portions of the frame segments into sealing engagement with the edge portions of the membranes to thereby seal the membranes to the frame.

2. The method of making a dialyzing element for a dialyzing cartridge which includes the steps of: molding an integral rectangularly shaped frame defining perimeter segments with an elongated recess in opposite side surfaces of each segment and an integral flange along each recess, said frame defining a thin plate extending between the segments and having a plurality of spaced projections having substantially hemispherical ends extending from opposite sides respectively of said plates; positioning semipermeable membranes in contact with the frame segments and said ends on opposite sides of the plate respectively with the edge portions of the membranes coextensive with the recesses and in close proximity to the flanges; and deforming and fusing the flanges into said recess to fill the same and cause the edge portions of the membranes to be imbedded between the flange material and the surfaces of the recess.

3. The invention of claim 2 wherein the flanges are fused by ultrasonic vibrations.

References Cited

UNITED STATES PATENTS

| | | | |
|---|---|---|---|
| 2,225,024 | 12/1940 | Weber | 23—252 |
| 2,444,147 | 6/1948 | Walton | 210—486 |
| 2,664,345 | 12/1953 | Marchand | 210—321 |
| 2,982,416 | 5/1961 | Bell | 210—321 |
| 3,051,316 | 8/1962 | MacNeill | 210—321 |
| 3,266,629 | 8/1966 | Megibow | 210—321 |
| 3,342,719 | 9/1967 | Chen et al. | 210—321 X |
| 3,369,343 | 2/1968 | Robb | 55—158 X |
| 3,077,268 | 2/1963 | Gubel et al | 210—321 |
| 3,370,710 | 2/1968 | Bluemle | 210—321 |
| 3,396,849 | 8/1968 | Lande et al. | 210—321 |

FOREIGN PATENTS

| | | |
|---|---|---|
| 938,127 | 10/1963 | Great Britain. |
| 10,523 | 1/1903 | Austria. |

OTHER REFERENCES

Someren et al.: "A Simple, No-Prime, Pumpless Artificial Kidney: A Preliminary Report," from the Trans. Amer. Soc. Artif. Int. Organs, 1963, vol. IX, pp. 73–78 relied on.

REUBEN FRIEDMAN, Primary Examiner

F. A. SPEAR, JR., Assistant Examiner

U.S. Cl. X.R.

210—22, 321, 346, 486; 264—248, 249